(12) United States Patent
Skiba

(10) Patent No.: US 8,865,887 B2
(45) Date of Patent: *Oct. 21, 2014

(54) METHOD FOR SYNTHESIZING CALIXARENE AND/OR CYCLODEXTRIN COPOLYMERS, TERPOLYMERS AND TETRAPOLYMERS, AND USES THEREOF

(76) Inventor: Mohamed Skiba, Montmain (FR)

( * ) Notice: Subject to any disclaimer, the term of this patent is extended or adjusted under 35 U.S.C. 154(b) by 148 days.

This patent is subject to a terminal disclaimer.

(21) Appl. No.: 13/519,631

(22) PCT Filed: Dec. 27, 2010

(86) PCT No.: PCT/FR2010/000876
§ 371 (c)(1),
(2), (4) Date: Sep. 24, 2012

(87) PCT Pub. No.: WO2011/080422
PCT Pub. Date: Jul. 7, 2011

(65) Prior Publication Data
US 2013/0018164 A1    Jan. 17, 2013

(30) Foreign Application Priority Data
Dec. 31, 2009   (FR) ...................... 09 06434

(51) Int. Cl.
| | | |
|---|---|---|
| C08L 5/16 | (2006.01) | |
| C08J 3/24 | (2006.01) | |
| C08B 37/16 | (2006.01) | |
| C08B 37/00 | (2006.01) | |
| C08G 65/38 | (2006.01) | |
| A61K 47/48 | (2006.01) | |
| A61K 47/40 | (2006.01) | |
| A61K 8/73 | (2006.01) | |

(52) U.S. Cl.
CPC ............... *C08B 37/0012* (2013.01); *C08J 3/24* (2013.01); *C08L 5/16* (2013.01); *C08B 37/0015* (2013.01)

USPC .......................................... 536/103; 527/103

(58) Field of Classification Search
None
See application file for complete search history.

(56) References Cited

U.S. PATENT DOCUMENTS 6,660,804 B1 *   12/2003   Weltrowski et al. ....... 525/54.23
2005/0153913 A1 *   7/2005   Kosak ............................ 514/44

FOREIGN PATENT DOCUMENTS

FR     WO0047630 A1    8/2000
WO    WO 0047630    *    8/2000   .............. C08B 37/18

OTHER PUBLICATIONS

Myriam Gerber, Authorized Officer, European Patent Office International Search Report on PCT/FR2010/000876, Apr. 7, 2011, 5 pages, Rijswijk, NL, 4 pgs, 2 ISR , 2 pgs translation of pp. 5-6 of ISR.

\* cited by examiner

*Primary Examiner* — James J Seidleck
*Assistant Examiner* — Peter A Salamon
(74) *Attorney, Agent, or Firm* — Louis Ventre, Jr.

(57) ABSTRACT

The present invention relates to a novel method for synthesizing a composition of polymers, copolymers, terpolymers and tetrapolymers, and to the use thereof, said composition being made from: cyclodextrins, in particular α-cyclodextrin, β-cyclodextrin, γ-cyclodextrin, the derivatives or corresponding mixtures thereof, and/or calix[n]arene(s) and/or of calix[n]arene derivative(s) and/or a mixture of two or more different calix[n]arenes selected from calix[n]arenes (n=4-20) and/or the derivatives thereof, and to the uses thereof. A method was developed on the basis of direct-melt polycondensation. The invention can be used in the pharmaceutical, human medicine, veterinary medicine, chemistry, separation chemistry, environmental, electronics, biological, diagnostics, phytosanitation, medicinal food, agri-food, and cosmetics fields, and in the nutraceutical field and in the field of molecular imprints (MIP).

17 Claims, 11 Drawing Sheets

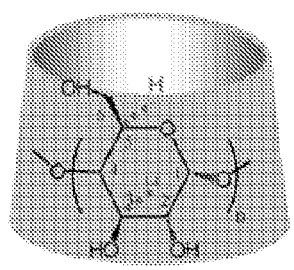
Figure 1: Chemical structure of β-cyclodextrin (n=7)
Figure 2: Comparison of the chemical structure of calix[4]arène and cyclodextrin

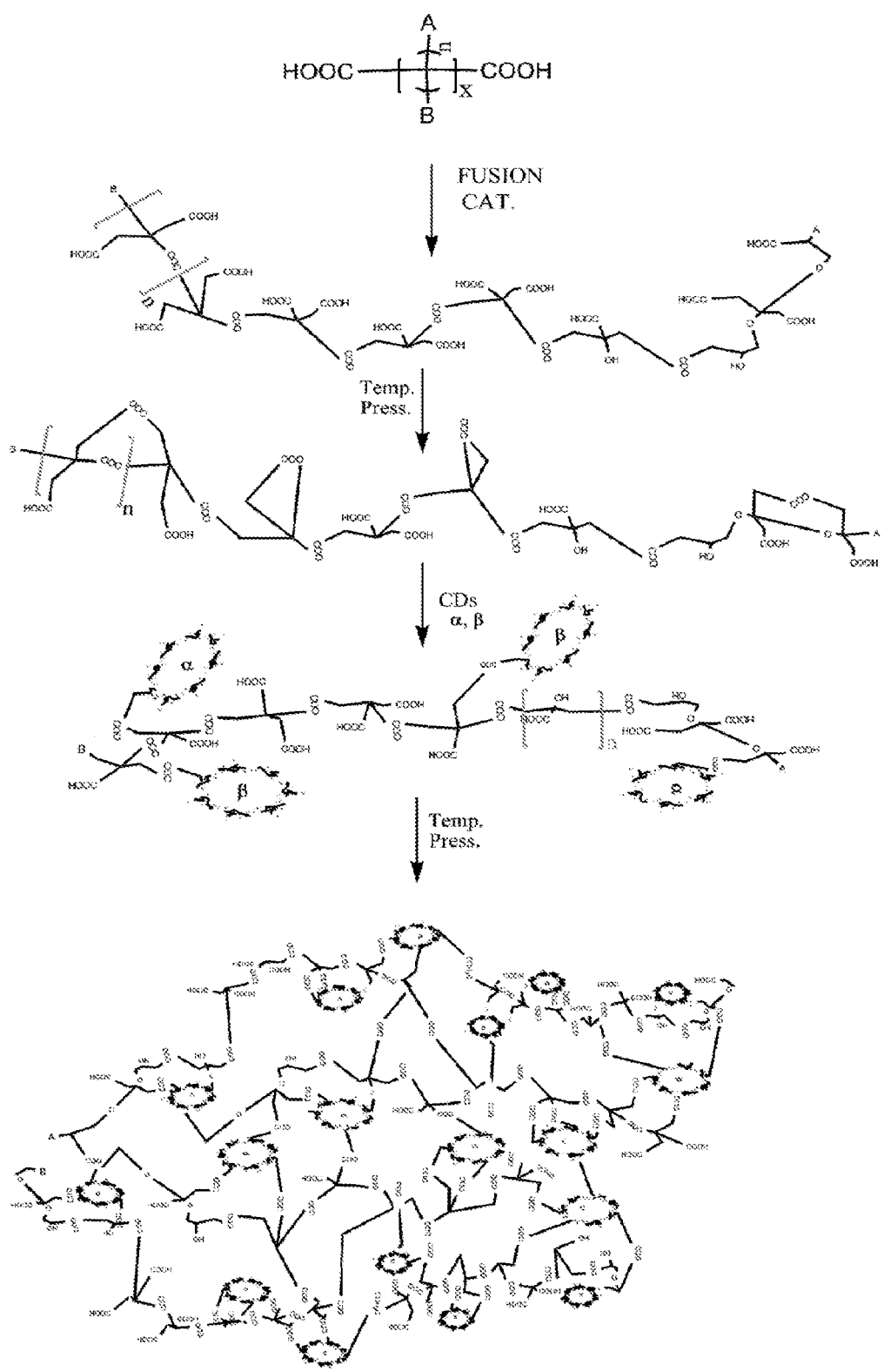
Figure 3: Mechanism of formation of terpolymère made form α and β-CD

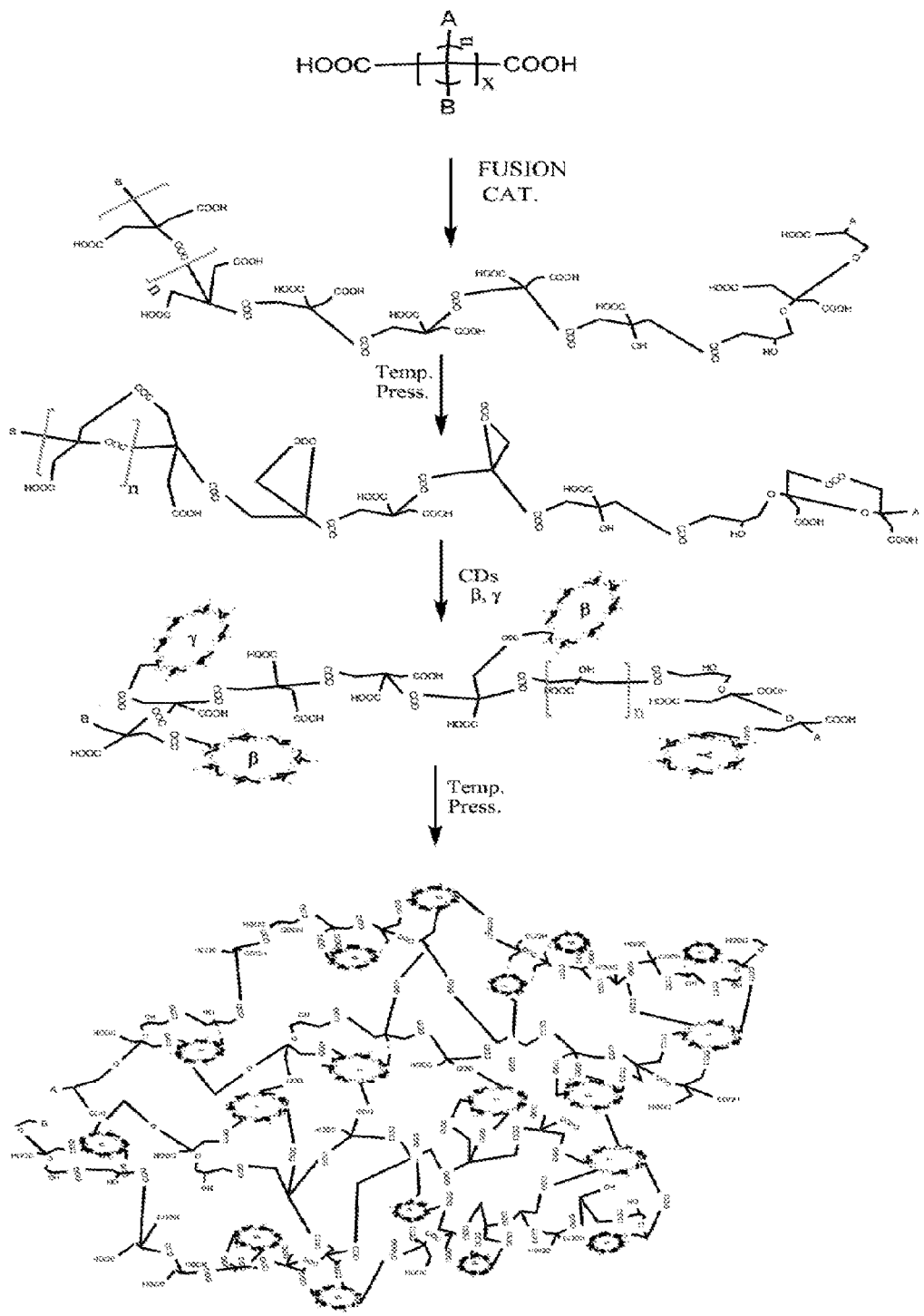
Figure 4: Mechanism of formation of terpolymere made of β and γ-CD

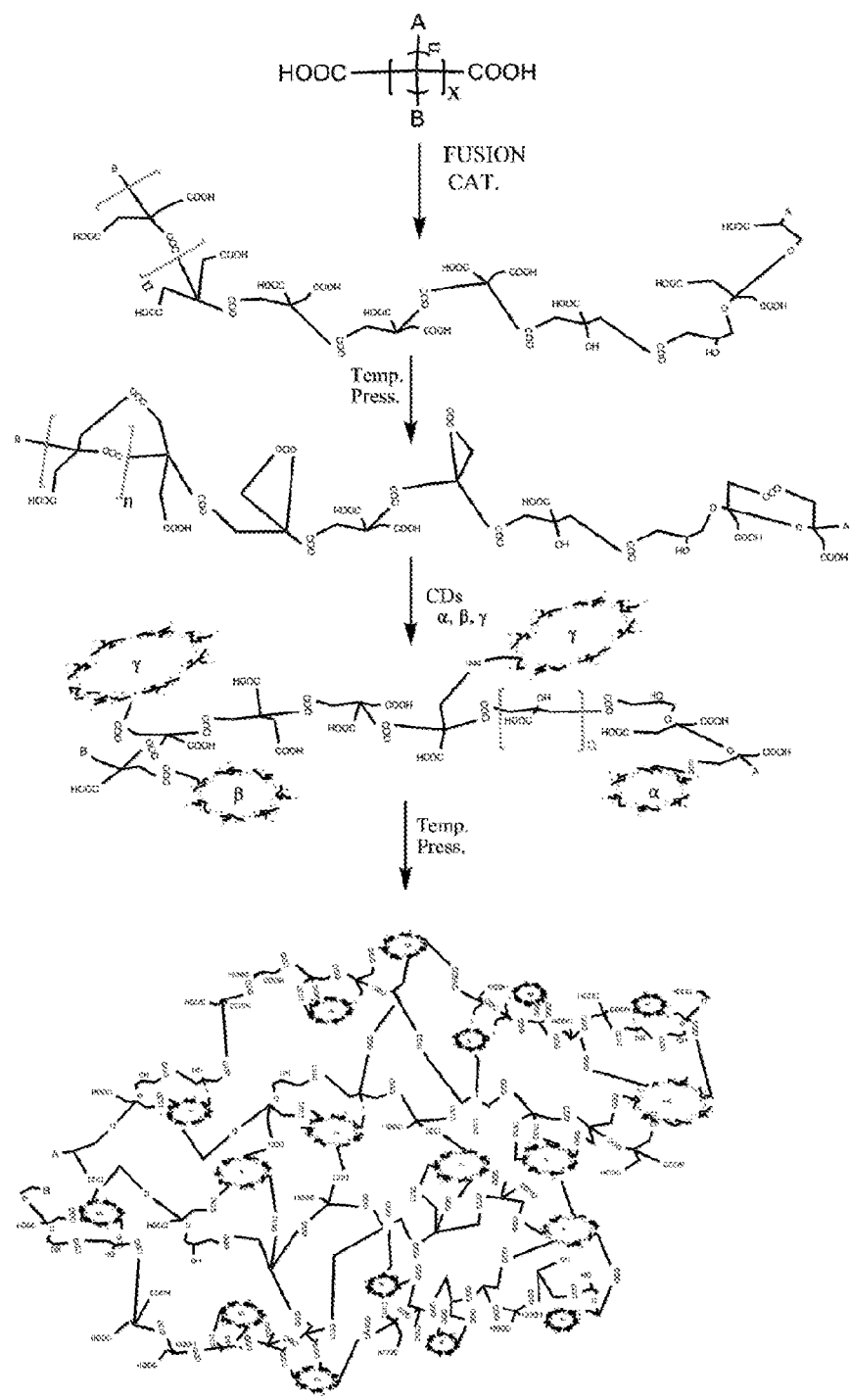
Figure 5: Mechanism of formation of terpolymere made of α, β and γ-CD

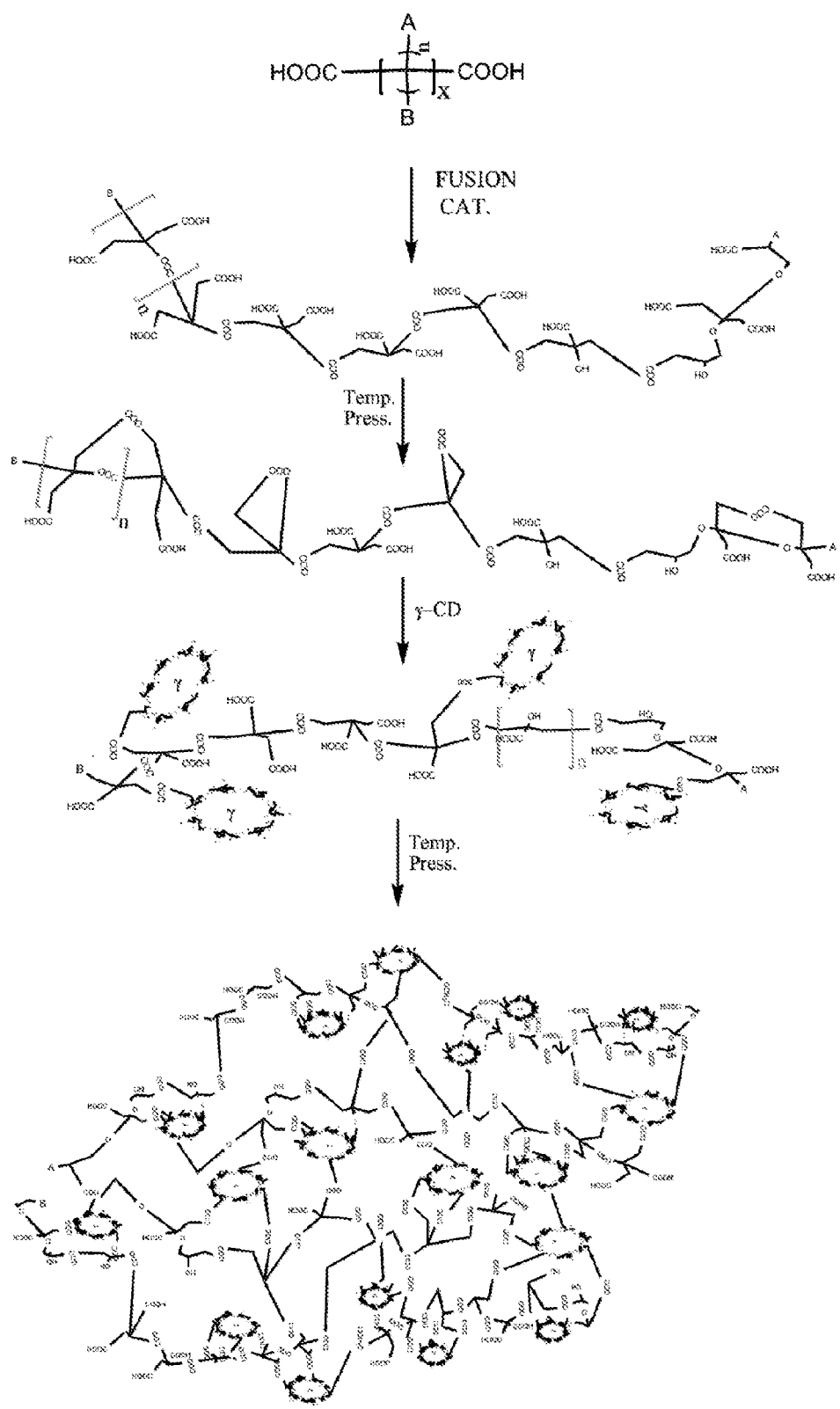
Figure 6: Mechanism of formation of terpolymere made of γ-CD

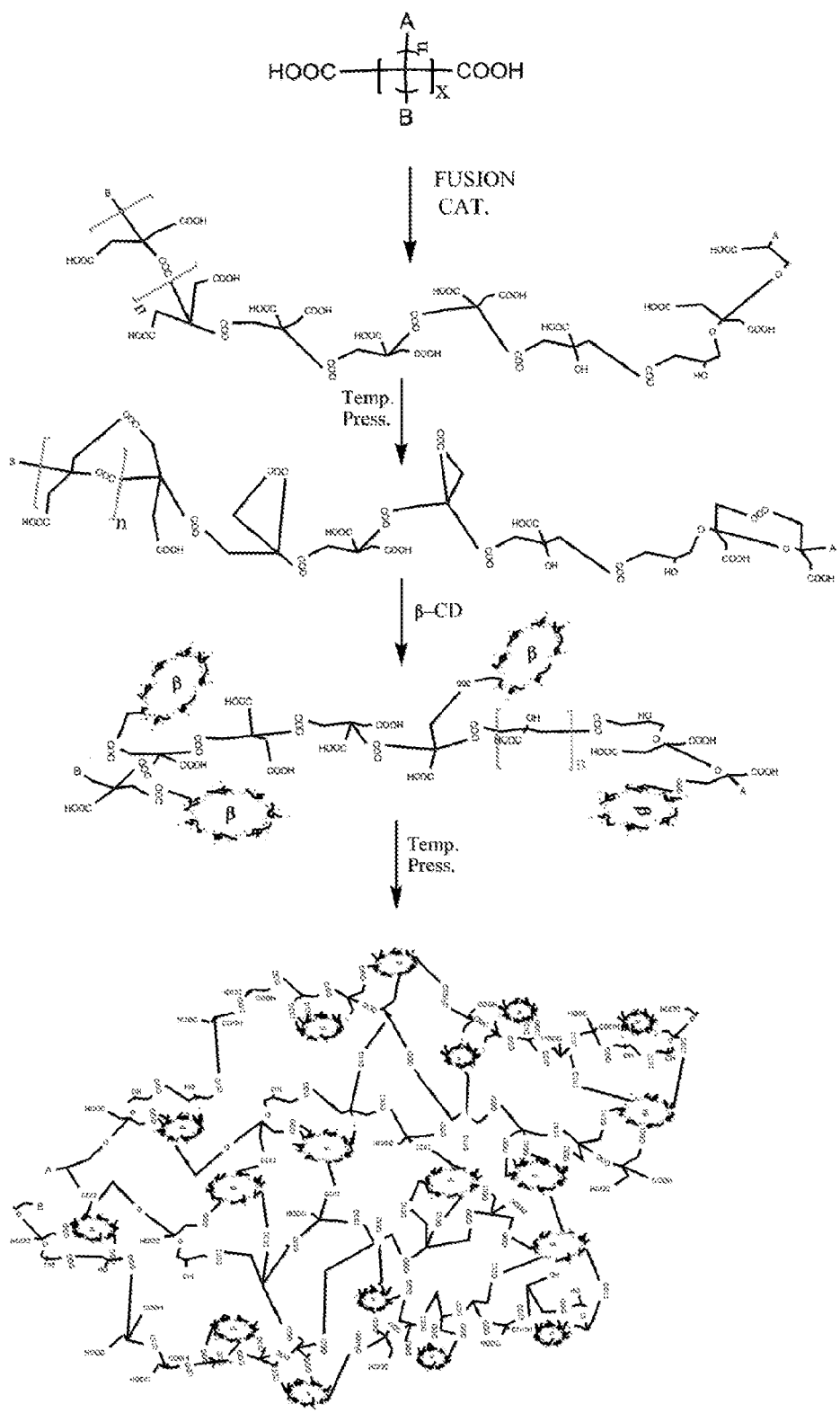
Figure 7: Mechanism of formation of terpolymere made of β-CD

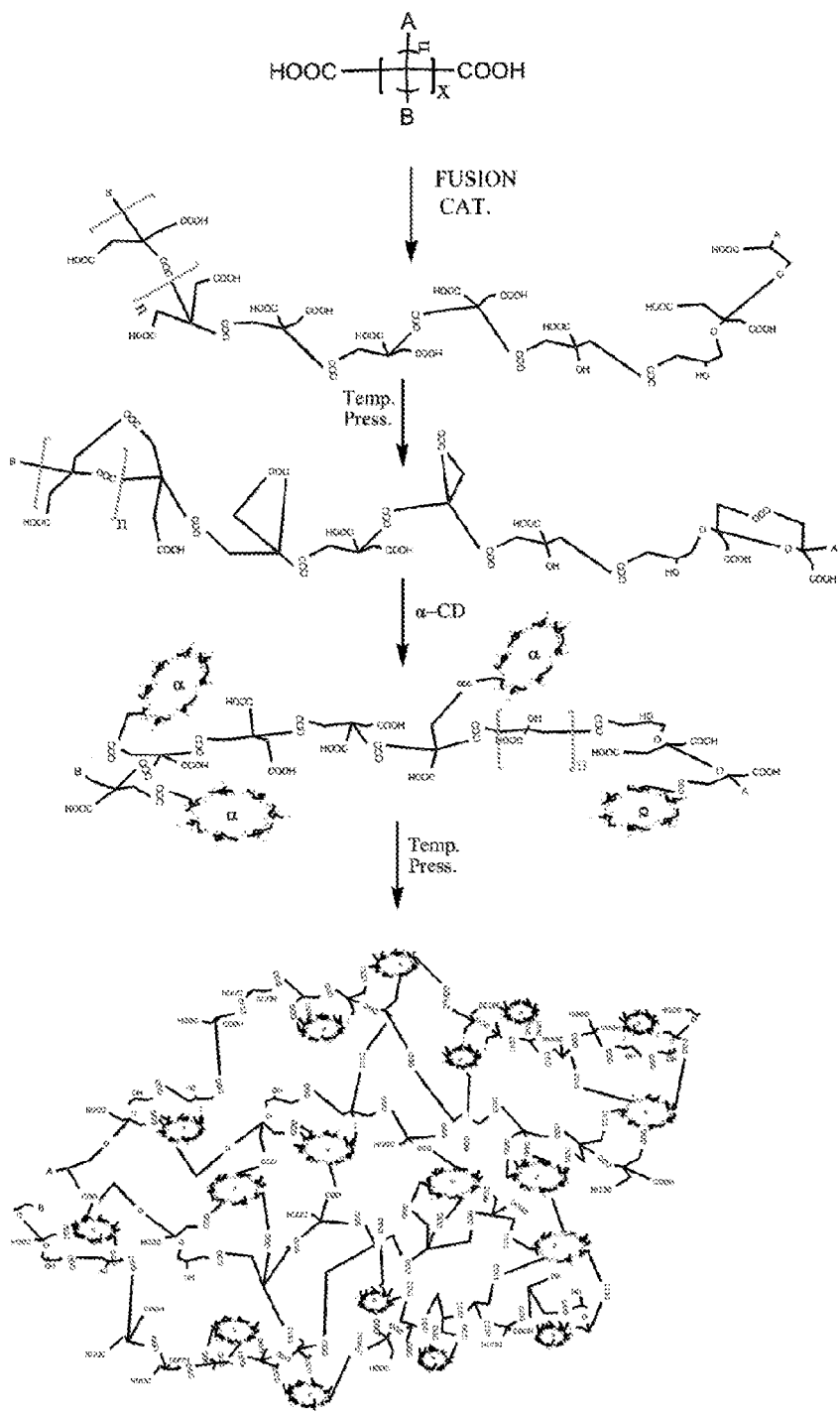
Figure 8: Mechanism of formation of terpolymere made of α-CD

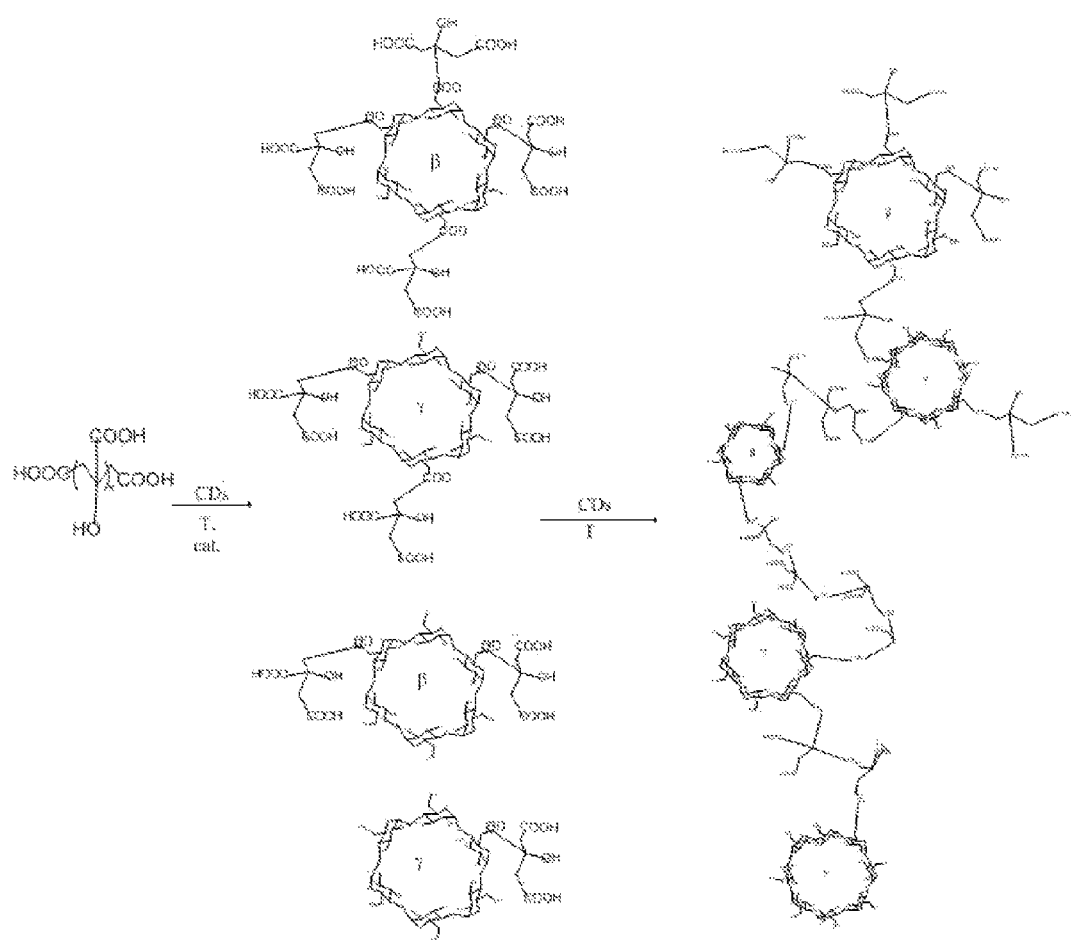
Figure 9: Mechanism of polycondensation of α-CD (WO 0047630)

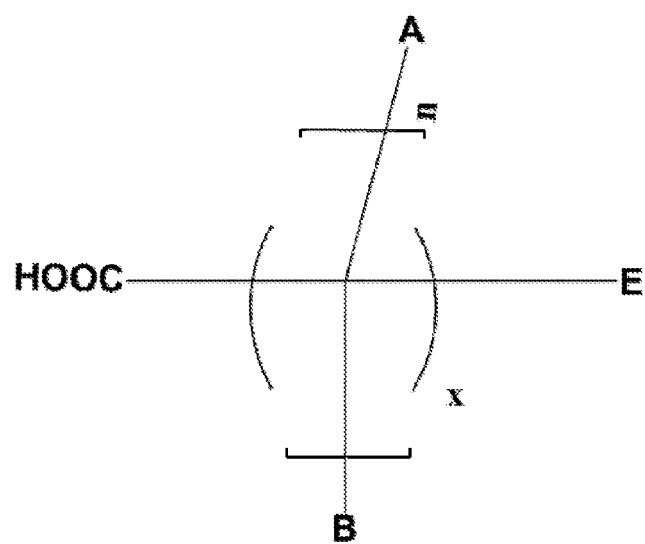
Figure 10: General chemical structure of poly-carboxylic acid

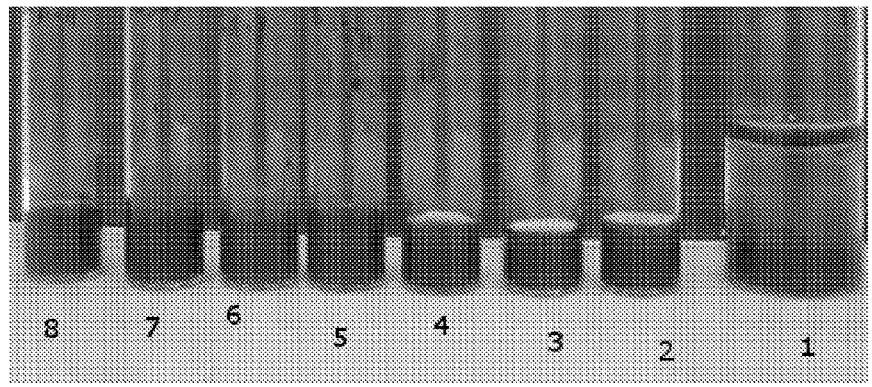

Figure 11: Copper nanopowder in water (1), Copper nanopowder in solution of poly-α-CD (2), Copper nanopowder in solution of poly-β-CD (3), Copper nanopowder in solution of poly-γ-CD (4), Copper nanopowder in solution of poly-α-β-CD (5), Copper nanopoudre in solution of poly-α-γ-CD (6), Copper nanopowder in solution of poly-α-β-γ-CD (7), Copper nanopowder in solution of poly-β-γ-CD (8).

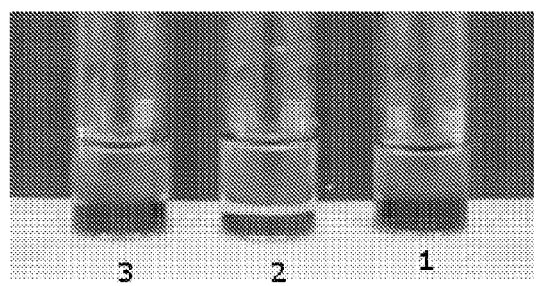

Figure 12: Copper nanopowder in solution of β-CD (1), Copper nanopowder in solution of HP-β-CD (2), Copper nanopowder in solution of PM-β-CD (3)

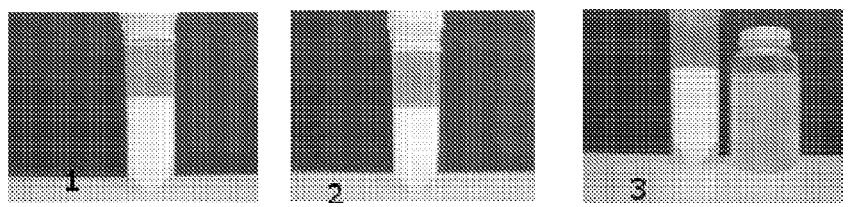
Figure 13: Picture 1; emulsion after 2 min of preparation -Picture 2: emulsion after 3 months – Picture 3: emulsion after dilution at 2%
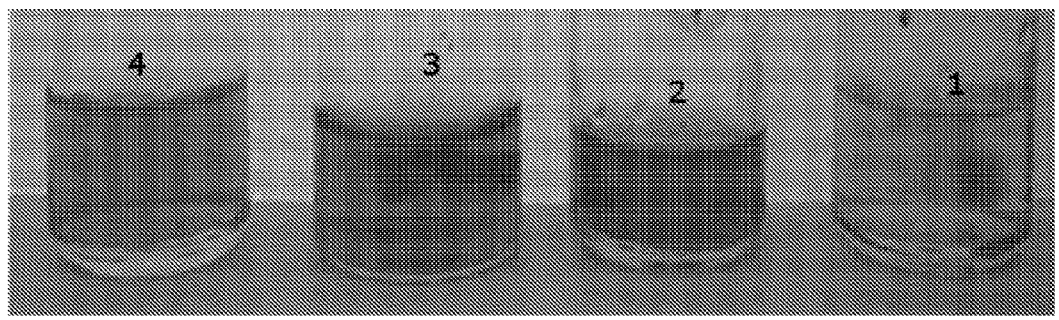
Figure 14: (1) solution of dye with insoluble α–β–γ–CD tetrapolymer, (2) solution of dye with soluble positive charged β-CD copolymer, (3) solution of dye with soluble β-CD copolymer , (4) solution of dye

METHOD FOR SYNTHESIZING CALIXARENE AND/OR CYCLODEXTRIN COPOLYMERS, TERPOLYMERS AND TETRAPOLYMERS, AND USES THEREOF

The present invention relates to a novel process for producing and to the uses soluble or insoluble copolymers, terpolymers and tetrapolymers made from:
cyclodextrin(s) and/or cyclodextrin derivative(s) and/or a mixture of two or three different cyclodextrins,
and/or calix[n]arene(s) and/or calix[n]arene derivative(s) and/or a mixture of two or more different selected from calix[n]arene(s) (n=4-20) and/or the derivatives thereof,
and crosslinking agent and/or a mixture of crosslinking agents, with or without a catalyst(s).

Cyclodextrins are cyclic oligomers composed of 6, 7 or 8 glucose units respectively termed $\alpha$, $\beta$ and $\gamma$ cyclodextrin. Cyclodextrins are known for their ability to include various molecules in their hydrophobic cavity, in particular allowing solubilization in water and biological environments of molecular structures little or not soluble in these mediums and if required, to improve their stability and bioavailability.

The proprieties can be used in fields as varied as the pharmaceutical, human medicine, veterinary medicine, chemistry, phytosanitation, medicinal food, agri-food, cosmetic and nutraceutical.

Native cyclodextrins (CD), because of their low solubility in water: 127 g/l for $\alpha$-CD, 18.8 g/l for $\beta$-CD and 236 g/l for $\gamma$-CD, can have be limited in their use, in particular in the case of $\beta$-cyclodextrin. In order to solve this, highly soluble modified cyclodextrins and amorphous structures may be used. The presence of hydroxyl groups on the native cyclodextrins make it possible to develop cyclodextrin derivatives having an improved solubility. Indeed, native cyclodextrins have three types of alcohol groups: a primary alcohol group by molecular structure of glucose (position 6) and two alcohol groups by molecular structure of glucose (position 2 and 3), which represents 21 alcohol groups for $\beta$-CD capable of reacting (FIG. 1). Among these derivatives, partially or completely methylated cyclodextrins have a significantly improved water solubility compared to native cyclodextrins. In addition, methylated cyclodextrins retain the properties of native cyclodextrins and in some cases can improve them with the extension of the cavity using substituted hydrophobic methyl groups. According to the size of the host molecules, their inclusion in the cavity of cyclodextrins is limited. For example, larger molecules, especially macromolecules, proteins and peptides are generally not suitable for inclusion in cyclodextrins. In addition, the molar ratio of cyclodextrin to host molecule is generally 1/1 or higher.

In contrast, cyclodextrin polymers have several advantages. For example, they have higher molecular weights than cyclodextrins, the macromolecular structure of cyclodextrin polymers means that they can be considered to be biomaterials and the stability constants of the polymer-substrate complexes are often larger than those of cyclodextrin-drug complexes. As a result, hydrophobic, hydrophilic compounds and supramolecules are more readily complexed and less readily released by cyclodextrin polymers than by native cyclodextrins.

In 2001, Kosak, et al. (U.S. Patent Publication 20010034333 and U.S. Patent Publication 20010021703), described the synthesis of cyclodestrin polymers using an expensive and toxic process. To overcome these drawbacks, Martel, et al. according to U.S. patent application Ser. No. 09/913,475 (2001) describe the synthesis of polymers containing cyclodextrin without the use of organic solvent, but with a very low yield of soluble polymer: less than 10%. without the use of an organic solvent, but with a very low yield of soluble polymer: lower than 10%. In addition, the mechanical properties and the molecular weight of these polymers are not controllable for stability and low molecular weight. The work of B. Martel, et al., (J. of Applied Polymer Science, Vol. 97, 433-442 (2005)) describe a 10% return for obtaining soluble polymers and 70% for the production of insoluble polymers. These low yields are the result of a solubilization of the all reagents in an aqueous phase according to the reaction 1, and since the reaction of esterification is a balance, the displacement of this reaction will be done towards the contrary direction of the formation of ester with a poor yield of polycondensation of cyclodextrins and on the other hand, with a very high rate of polymers with very low molecular weight involving a purification step during a long time (60 hours of dialysis).

Reaction 1: esterification reaction according the patent W00047630.

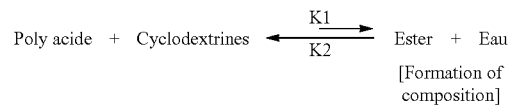

[Formation of composition]

Another disadvantage according to this patent application, on the one hand, the process of polymerization can be implemented only with crosslinking agents in the form of tri- or polycarboxylic acids and not from dibasic or monobasic agents because this process use a temperature of polymerization in the range 100° C. to 200° C. EP20000905143 patents, PCT/FR00/00377 (2000), and U.S. patent application Ser. No. 09/913,475 (2001) do not make polymers from diacids (eg maleic acid) and tetra acids (eg EDTA) because it is necessary to heat at 210° C. and 270° C., respectively. Moreover this prior process is limited by the aqueous solubility of the crosslinking agent.

On the other hand, these patents provide polymers based on a single type of cyclodextrin. The polymers prepared from $\beta$-cyclodextrins are very rigid, the polymers prepared from $\alpha$-cyclodextrins are very flexible and the polymers prepared from $\gamma$-cyclodextrins range between the two states.

Indeed, all these methods have the disadvantage of leading to products that are moderately effective because they use a single type of cyclodextrin both into one type of inclusion with guest molecules, knowing that the inclusion complexes form as a function of the affinity of the guest molecule with the size of the cavity of the cyclodextrin used.

Thus, the development of new cyclodextrin polymers is needed in order to overcome the abovementioned limitations, more particularly in terms of molecular encapsulation and type of polymers. The use of a mixture of polymers synthesized from various cyclodextrins makes it possible to have a very great probability of obtaining various compounds of inclusion, a better stability and a better solubility of the pharmaceutical drugs.

The present invention provides a novel process for producing polymers, copolymers, terpolymers and tetrapolymers based on cyclodextrins or a mixture of two or three different cyclodextrins and/or their derivatives. This process is non-polluting, inexpensive and can be used on an industrial scale with higher yields according to reaction 2.

Reaction 2: Esterification reaction according to the invention.

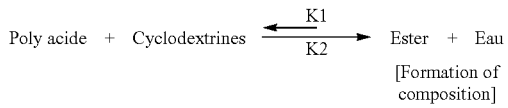

[Formation of composition]

This new process does not use water for a reaction medium, but a melting by heating of the crosslinking agent without being limited by their solubility in the reaction medium, and also the process yields polymers, copolymers, terpolymers and tetrapolymers based on cyclodextrin and/or from a mixture of two or three different cyclodextrins and/or their derivatives.

BRIEF DESCRIPTION OF THE DRAWINGS

FIG. 1 illustrates the chemical structure of beta-cyclodextrin

FIG. 2 presents a comparison of the chemical structure of calix[4]arene and cyclodextrin.

FIG. 3 illustrates a mechanism of formation of terpolymere made of alpha and beta-CD.

FIG. 4 illustrates a mechanism of formation of terpolymere made of alpha and gamma-CD.

FIG. 5 illustrates a mechanism of formation of terpolymere made of alpha, beta and gamma-CD.

FIG. 6 illustrates a mechanism of formation of terpolymere made of gamma-CD.

FIG. 7 illustrates a mechanism of formation of terpolymere made of beta-CD.

FIG. 8 illustrates a mechanism of formation of terpolymere made of alpha-CD.

FIG. 9 illustrates a mechanism of ploycondensation of alpha-CD.

FIG. 10 illustrates the general chemical structure of polycarboxylic acid.

FIG. 11 illustrates copper nanopowder in solutions, including water; poly-alpha-CD; poly-beta-CD; poly-gamma-CD; poly-alpha-beta-CD; poly-alpha-gamma-CD; poly-alpha-beta-gamma-CD; and poly-beta-gamma-CD.

FIG. 12 illustrates copper nanopowder in solutions of beta-CD; HP-beta-CD; and PM-beta-CD.

FIG. 13 presents three photographs: Picture 1; emulsion after 2 min. of preparation; Picture 2: emulsion after 3 months; and Picture 3: emulsion after dilution at 2%.

FIG. 14 presents four photographs: (1) solution of dye with insoluble alpha-beta-gamma-CD tetrapolymer, (2) solution of dye with soluble positive charged beta-CD copolymer, (3) solution of dye with soluble beta-CD copolymer, (4) solution of dye.

This new process allows also the use of all types of acids and their derivatives, as crosslinking agents without being limited by their solubility in the reactional medium, and also obtaining polymers, copolymers, terpolymers and tetrapolymers based on cyclodextrins and/or a mixture of two or three different cyclodextrins and/or cyclodextrin derivative(s).

The mixture of cyclodextrins according to the present invention comprises at least two different cyclodextrins, which may each be present, in a content greater than or equal to 1% by weight, more particularly in a content greater than or equal to 10% by weight, or even in a content greater than or equal to 20% by weight, or even in a content greater than or equal to 30% by weight, or even in a content greater than or equal to 40% by weight, or even in a content greater than or equal to 50% by weight relative to the total weight of the cyclodextrin.

In an alternative embodiment, the mixture of cyclodextrins comprises two cyclodextrins, more particularly:
an alpha-cyclodextrin/beta-cyclodextrin mixture, more particularly in a ratio comprised between 10/1 and 1/10, or even between 4/1 and 1/4;
an alpha-cyclodextrin/gamma-cyclodextrin mixture, more particularly in a ratio comprised between 10/1 and 1/10, or even between 4/1 and 1/4; or
a beta-cyclodextrin/gamma-cyclodextrin mixture, more particularly in a ratio comprised between 10/1 and 1/10, or even between 4/1 and 1/4.

In another alternative embodiment, the mixture of cyclodextrins comprises three cyclodextrins, more particularly an alpha-cyclodextrin/beta-cyclodextrin/gamma-cyclodextrin mixture, more particularly with an alpha-cyclodextrin/beta-cyclodextrin ratio comprised between 10/1 and 1/10, or even between 4/1 and 1/4, and/or a beta-cyclodextrin/gamma-cyclodextrin ratio comprised between 10/1 and 1/10, or even between 4/1 and 1/4.

According to another aspect, the mixture of cyclodextrins comprises three cyclodextrins, more particularly an alpha-cyclodextrin/beta-cyclodextrin/gamma-cyclodextrin mixture, more particularly with an alpha-cyclodextrin to beta-cyclodextrin ratio of from 10/1 and 1/10, or even between 4/1 and 1/4, and/or a beta-cyclodextrin to gamma-cyclodextrin ratio from 10/1 to 1/10, or even between 4/1 and 1/4.

According to another of the its aspects, the invention relates to a composition comprising or consisting in a mixture at least two different cyclodextrins selected from alpha-, beta-, and gamma-cyclodextrin and/or derivatives thereof, and at least one cross-linking agent.

The composition may have cyclodextrin tp cross-linking agent weight ratio greater than or equal to 0.5, more particularly greater than or equal to 1, or even greater than or equal to 3. More particularly, the composition comprises a content in crosslinking agent greater than or equal to 20% by weight, in particular greater than or equal to 30% by weight, advantageously greater than or equal to 40% by weight, more particularly greater than or equal to 50% by weight based on the total weight of the composition.

The composition may include at least two different cyclodextrins, each of these present in a content greater than or equal to 1% by weight, particularly in a content greater than or equal to 10% by weight, or event in a content greater than or equal to 20% by weight, or even in a content greater than or equal to 30% by weight, or even in a content greater than or equal to 40% by weight, or even in a content greater than or equal to 50% by weight based on the total weight of the composition.

The composition according to the invention may be in the form of liquid, particularly an aqueous liquid, a semisolid or solid. It can more particularly be in the form of a powder, tablets, capsules, a cream, an emulsion, more particularly an aqueous or oily emulsion, or even a multiple emulsion, of liposomes, nanoparticles, microparticles or a suspension.

The composition according to the invention may be pharmaceutical, pharmafood, veterinary, chemistry, phytosanitation, nutraceutical, dietary, cosmetic, in the field of molecular imprints (MIP) or in the field of environmental comprising a composition according to the invention.

The method for the production of composition of copolymers, terpolymers and tetrapolymers soluble and/or insoluble made from:

cyclodextrin(s) and/or cyclodextrin derivative(s) and/or a mixture of different cyclodextrins, and/or calix[n]arene(s) and/or calix[n]arene(s) derivative and/or a mixture of two or more different selected from calix[n]arene(s) (n=4-20) and/or the derivatives thereof, according to the invention and comprising the following operations:

Step 1:

Fusion of the crosslinking agent or the mixture of crosslinking agents in a reactor by heating at a temperature between 90° C. and 400° C. then at a temperature of 140° C. to produce mainly soluble composition of polymers, copolymers, terpolymers or tetrapolymers, or at a temperature of 170° C. to produce mainly insoluble composition of polymers, copolymers, terpolymers or tetrapolymers.

Step 2:

Adding cyclodextrin or mixture of different cyclodextrins in the form of powder with a ratio cyclodextrin (CD)/crosslinking agent (AR), CD/AR between 1 and 3, with or without catalyst(s).

Step 3:

Stirring under vacuum for a time between 1 minute and 240 minutes, preferably for 30 minutes, to obtain mainly the soluble composition of polymers, copolymers, terpolymers or tetrapolymers, or for 2 hours to obtain mainly the insoluble composition of polymers, copolymers, terpolymers or tetrapolymers, to eliminate the water which was formed during the esterification step, either for the formation of the ester bonds or small molecules during the condensation, making it possible to obtain a solid residue of the new composition of polymer, copolymer, terpolymer or tetrapolymer.

Step 4:

The solid residue obtained according to the invention, was washed successively with three 20 milliliter (mL) volumes of water and with two 50 mL volumes of methanol. The solid residue from washing was then dried at a temperature of 70° C., to obtain mainly the insoluble composition.

Step 5:

The first fraction of 60 mL from wasting was filtered or dialyzed using a 12000-14000 D membrane. The resulting dialyzed solution was controlled by conductimetric measurements. In practice, the conductivity of distilled water used is measured at T0 (as of its recovery) and at T1 (after a dialysis for 18 hours) until obtaining a conductivity of T1 equal to that of T0. The resulting filtered or dialyzed solution was spray-dried or freeze-dried, representing the soluble composition.

Preferably, the mixture is heated under vacuum at a temperature of 150° C., preferably, at 170° C. for a time higher than 60 minutes to obtain the maximum yield of insoluble composition. In an alternative way, the mixture is heated under vacuum at a temperature of than 140° C., preferably at 150° C. for a time greater than 20 minutes, preferably for about 30 minutes to obtain mainly a yield of soluble composition.

Mechanism of Polymerization:

The heating allows firstly the condensation, and the majority of carboxylic functions of polyacid become anhydrous (FIGS. 3-8). Then, the anhydrous functions react with hydroxyl groups of cyclodextrins. This mechanism is different from that according to patent WO00/47630 which describes the simultaneous condensation of polyacid and the interaction with the hydroxyl groups of cyclodextrins, and which leads to compositions with very low molecular weight and with a high polydispersity index (FIG. 9).

By analogy, the calix[n]arenes are macrocyclic structures with complexing properties like cyclodextrins (FIG. 2). Calix[n]arenes, of artificial origin, are macrocycles formed from "n" phenolic units (n=4 to 20) interconnected by methylene bridges on the ortho positions of phenol cycles.

The process of the invention can produce copolymers, terpolymers or tetrapolymers that include in their backbone, molecules of:

cyclodextrin and/or cyclodextrin derivatives, as well as copolymers, terpolymers or tetrapolymers that include molecules of cyclodextrin(s) and/or cyclodextrin derivative(s) as substitutes or side chains, and/or calix[n]arene(s) and/or calix[n]arene derivative(s) and/or a mixture of two or more different selected from calix[n]arene(s) (n=4 to 20) and/or the derivatives thereof.

The process of the present invention is preferably applicable to cyclodextrin(s) selected from α-cyclodextrin, β-cyclodextrin, and γ-cyclodextrin and to hydroxypropyl, methyl, ethyl, sulfobutylether or acetyl derivatives of α-cyclodextrin, β-cyclodextrin and γ-cyclodextrin, and to mixtures formed from said cyclodextrins and said cyclodextrin derivatives and the crosslinking agent such as poly(carboxylic) acid or poly(carboxylic) acid anhydride selected from the following poly(carboxylic) acids and poly(carboxylic) acid anhydrides: saturated and unsaturated acyclic poly(carboxylic) acids, saturated and unsaturated cyclic poly(carboxylic) acids, aromatic poly(carboxylic) acids, hydroxypoly(carboxylic) acids, preferably selected from citric acid, poly(acrylic) acid, poly(methacrylic) acid, 1,2,3,4-butanetetracarboxylic acid, 1,2,3-propanetricarboxylic acid, aconitic acid, all-cis-t,2,3,4cyclopentanetetracarboxylic acid, mellitic acid, oxydisuccinic acid, and thiodisuccinic acid characterized in that the repeat unit has the following general formula $$x \text{ and } n=(1\text{-}10^{+8}).$$ (FIG. 10):

where E represents one of the functional groups for polycondensation mentioned in list Z. A, B: can be either a hydrogen atom (H) or a fluorine atom (F), or one of the functional groups mentioned in list G.

List (Z): list of condensation groups: Carboxylic acid, amine, isocyanates and cyanamides and their derivatives, and other essential chemical groups for the condensation reaction are in the reference: Chemistry and Physical Chemistry of Polymers (Paperback), Michel Fontanille (Author), Yves Gnanou (Author), Editor: Dunod ISBN-10: 2100039822-ISBN-13: 978-2100039821.

List G: list of functional groups: Acetal, acetoxy, acetyle, anhydride acide, acryle, groups of activation and of deactivation, acyles, acyle halide, acylal, acyloin, acylsilane, alcools, aldehydes, aldimine, alcenes, alkoxyde, alkoxy, alkyles, alkyls cycloalcane, alkyls nitrites, alcyne, allene, allyles, amides, amidines, amine oxyde, amyle, aryle, arylene, azide, aziridine, azo, azoxy, benzoyle, benzyle, beta-lactames, bisthiosemicarbazone, biuret, boronic acid, butyles, carbamates, carbenes, carbinoles, carbodiimide, carbonate ester, carbonyl, carboxamide, carboxyl groups, carboxylique acide, chloroformate, crotyles, cumulene, cyanamide, cyanate, cyanate ester, cyanamides, cyanohydrines, cyclopropane, diazo, diazonium, diols, enamines, enols, enol ethers, enolate anion, enone, enyne, episulfide, epoxyde, ester, ethers, ethyl groups, glycosidic bond connections, guanidine, halide, halohydrin, haloketone, hemiacetal, hemiaminal, hydrazide, hydrazine, hydrazone, hydroxamic acid, hydroxyl, hydroxyl radical, hydroxylamine, hydroxymethyl, imine, iminium, isobutyramide, isocyanate, isocyanide, isopropyl isothiocyanate, ketal, ketene, cetenimine, cetone, cetyl, lactam, lactol, mesylate, metal acetylide, methine, methoxy, methyl groups, methylene, methylenedioxy, n-oxoammonium salt, nitrate, nitrile, nitrilimine, nitrite, nitro, nitroamine, nitronate, nitrone, nitronium ion, nitrosamine, nitroso, nitrosyl, nonaflate, organique peroxyde, organosulfate, orthoester, osazone, oxime, oxon (chemical), pentyl, persistent carbene, phenacyl, phenyl groupes, phenylene, phosphaalcyne, phosphate, phosphinate, phosphine, phosphine oxide, phosphinite, phosphite, phosphonate, phosphonite, phosphoniumes, phosphorane, propargyl, propyls, propynyls, selenol, selenonique acide, semicarbazide, semicarbazone, silyl enol ethers, silyl ethers, sulfide, sulfinic acid, sulfonamide, sulfonate, sulfonic acid, sulfonyl, sulfoxyde, sulfuryl, thial, thioacetal, thioamide, thiocarboxy, thiocyanate, thioester, thioethers, thioketal, thioketone, thiols, thiourea, tosyl, triazene, triflate, trifluoromethyl, trihalide, trimethyl silyl triol, urea, vanillyles, vinyls, vinyl halide, xanthate, ylide, ynolate, derivatives of silicone.

The catalyst is selected from among dihydrogen phosphates, hydrogen phosphates, phosphates, hypophosphites, alkali metal phosphates, alkali metal salts of polyphosphoric acids, carbonates, bicarbonates, acetates, borates, alkali metal hydroxides, aliphatic amines and ammonia, preferably selected from sodium hydrogen phosphate, sodium dihydrogen phosphate and sodium hypophosphite. The catalyst can be associated with an inorganic solid support or a mixture of mineral solid support like alumina, silica gels, silica, aluminum silicate, zeolites, titanium oxides, zirconium, niobium oxides, chromium oxides, magnesium or tin oxides to increase the heat-transferring surfaces during polymerization.

These compositions of copolymers, terpolymers and tetrapolymers made from cyclodextrin(s) and/or a mixture of different cyclodextrins, and/or cyclodextrin derivative(s) were obtained, but not exclusively, by the process of the present invention. They can be modified, branched and/or cross-linked. Advantageously, the composition may include a positively charged compound, a negatively charged compound and/or modified compound(s) for example by fatty acid chains, PEG, PVP, chitosan, amino-acids.

The following nonlimiting examples illustrate the process of the present invention as the polymers, copolymers, terpolymers and tetrapolymers of the present invention.

EXAMPLE 1

Synthesis of soluble alpha-beta-gamma-cyclodextrin tetrapolymers by direct melt polycondensation: 3 g of citric acid were transferred into a reactor which was maintained at a temperature of 140° C. A mixture of 1 g of α-cyclodextrin, 1.3 g of β-cyclodextrin, 1.5 g of γ-cyclodextrin, and 1 g of sodium phosphate dibasic ($Na_2HPO_4$) as catalyst was then added. The whole was stirred for 30 minutes under vacuum. The solid residue obtained according to the invention, was washed successively with three volumes of 20 mL of water. The fraction of water (60 mL) from washing was filtered by membrane then dried by spray-drying.

EXAMPLE 2

Synthesis of soluble alpha-beta-cyclodextrin terpolymers by direct melt polycondensation: 2 g of citric acid were transferred into a reactor which was maintained at a temperature of 140° C. A mixture of 1.5 g of alpha-cyclodextrin, 1.5 g of beta-cyclodextrin and 0.5 g of sodium phosphate dibasic ($Na_2HPO_4$) as catalyst was then added. The whole was stirred for 30 minutes under vacuum. The solid residue obtained according to the invention, was washed successively with three volumes of 20 mL of water. The fraction of water (60 mL) from washing was filtered by membrane then lyophilized.

EXAMPLE 3

Synthesis of soluble alpha-gamma-cyclodextrin terpolymers by direct melt polycondensation: 2 g of citric acid were transferred into a reactor which was maintained at a temperature of 140° C. A mixture of 1.5 g of alpha-cyclodextrin, 1.5 g of gamma-cyclodextrin and 0.5 g of sodium phosphate dibasic ($Na_2HPO_4$) as catalyst was then added. The whole was stirred for 30 minutes under vacuum. The solid residue obtained according to the invention, was washed successively with three volumes of 20 mL of water. The fraction of water (60 mL) from washing was filtered by membrane then lyophilized.

EXAMPLE 4

Synthesis of soluble beta-gamma-cyclodextrin terpolymers by direct melt polycondensation: 2 g of citric acid were transferred into a reactor which was maintained at a temperature of 140° C. A mixture of 1.5 g of beta-cyclodextrin, 1.5 g of gamma-cyclodextrin and 0.5 g of sodium phosphate dibasic ($Na_2HPO_4$) as catalyst was then added. The whole was stirred for 30 minutes under vacuum. The solid residue obtained according to the invention, was washed successively with three volumes of 20 mL of water. The fraction of water (60 mL) from washing was filtered by membrane then lyophilized.

EXAMPLE 5

Synthesis of soluble beta-cyclodextrin polymers by direct melt polycondensation: 3 g of citric acid were transferred into a reactor which was maintained at a temperature of 140° C. A mixture of 3 g of beta-cyclodextrin and 0.5 g of sodium phosphate dibasic ($Na_2HPO_4$) as catalyst was then added. The whole was stirred for 30 minutes under vacuum. The solid residue obtained according to the invention, was washed successively with three volumes of 20 mL of water. The fraction of water (60 mL) from washing was filtered by membrane then lyophilized.

EXAMPLE 6

Synthesis of soluble alpha-cyclodextrin polymers by direct melt polycondensation: 3 g of citric acid were transferred into a reactor which was maintained at a temperature of 140° C. A mixture of 3 g of alpha-cyclodextrin and 0.5 g of sodium phosphate dibasic ($Na_2HPO_4$) as catalyst was then added. The whole was stirred for 30 minutes under vacuum. The solid residue obtained according to the invention, was washed successively with three volumes of 20 mL of water. The fraction of water (60 mL) from washing was filtered by membrane then lyophilized.

EXAMPLE 7

Synthesis of soluble gamma-cyclodextrin polymers by direct melt polycondensation: 3 g of citric acid were transferred into a reactor which was maintained at a temperature of 140° C. A mixture of 3 g of gamma-cyclodextrin and 0.5 g of sodium phosphate dibasic ($Na_2HPO_4$) as catalyst was then added. The whole was stirred for 30 minutes under vacuum. The solid residue obtained according to the invention, was washed successively with three volumes of 20 mL of water. The fraction of water (60 mL) from washing was filtered by membrane then lyophilized.

EXAMPLE 8

Determination of the molar mass of cyclodextrin polymers obtained either by the new process (the invention) or according to patent WO 00/47630 (anterior art) by Size Exclusion Chromatography coupled with Multiangle Laser-light Scattering (SEC/MALLS): This method makes it possible to determine the mass distributions of polymers synthesized according to the present invention. The Size Exclusion Chromatography (SEC) is carried out to separate the macromolecules according to their sizes (their hydrodynamic volume in solution). For that, the solutions of polymers were injected then eluted on columns which are filled with nonadsorbent porous material. At the exit of the column, the fractions are detected according to their properties. Contrary to the techniques based on standard polymers and to a simple detection of concentrations (usually with a differential refractometer), the addition of a second detection by diffusion of the multiangle Laser-light, sensitive to the molecular weights, gives access to instantaneous variations of the giration radius and to the average molar mass (Mw) of the eluted species at each time of elution, and to come back to the total mass distribution.

The instrument is equipped with a degazer (ERC-413), a pump (Flom Intelligent Pump, Japan) at a flow rate of 0.6 mL/min$^{-1}$, a filter with pore size of 0.45 μm, an injector Rheodyne (100 μL), a guard column (OHpak SBG, Showa Denko) and two columns (OHpak SB-804 HQ and SB-806 HQ). The system is connected to a triple detection: diffusion of the multiangle Laser-light, diffusion of the quasi-elastic light and refractometric detection.

|  | Mw (g/mol) | | |
| --- | --- | --- | --- |
|  | WO 00/47630 Anterior art | Present invention | Aqueous solubility (mg/mL) |
| Poly alpha-CD | 100 000 | 250 000 | >1200 |
| Poly beta-CD | 100 000 | 270 000 | >1200 |
| Poly gamma-CD | 100 000 | 300 000 | >1200 |

EXAMPLE 9

Synthesis of soluble alpha-beta-gamma-cyclodextrin tetrapolymers grafted by fatty acid chains by direct melt polycondensation: 3 g of citric acid and 0.3 g of stearic acid were transferred into a reactor which was maintained at a temperature of 140° C. A mixture of 1 g of alpha-cyclodextrin, 1.3 g of beta-cyclodextrin, 1.5 g of gamma-cyclodextrin, and 1 g of sodium phosphate dibasic ($Na_2HPO_4$) as catalyst was then added. The whole was stirred for 30 minutes under vacuum. The solid residue obtained according to the invention, was washed successively with three volumes of 20 mL of water. The fraction of water (60 mL) from washing was filtered by membrane then dried by spray-drying.

EXAMPLE 10

Synthesis of insoluble alpha-beta-cyclodextrin tetrapolymers by direct melt polycondensation: 3 g of citric acid were transferred into a reactor which was maintained at a temperature of 140° C. A mixture of 1.2 g of alpha-cyclodextrin, 2.3 g of beta-cyclodextrin and 1 g of sodium phosphate dibasic ($Na_2HPO_4$) as catalyst was then added. The whole was stirred for 60 minutes at a temperature of 170° C. under vacuum. The solid product obtained according to the invention, was washed successively with three volumes of 20 mL of water and with two volumes of 50 mL of ethanol. The solid residue from washing was then dried at a temperature of 70° C. to obtain the insoluble composition.

EXAMPLE 11

Synthesis of insoluble alpha-beta-cyclodextrin tetrapolymers containing EDTA by direct melt polycondensation: 3 g of ethylene diamine tetra acetic (EDTA) were transferred into a reactor which was maintained at a temperature of 240° C. A mixture of 1.2 g of alpha-cyclodextrin, 2.3 g of beta-cyclodextrin and 1 g of sodium phosphate dibasic ($Na_2HPO_4$) as catalyst was then added. The whole was stirred for 60 minutes at a temperature of 170° C. under vacuum. The solid product obtained according to the invention, was washed successively with three volumes of 20 mL of water and with two volumes of 50 mL of ethanol. The solid residue from washing was then dried at a temperature of 70° C. to obtain the insoluble composition.

EXAMPLE 12

Synthesis of soluble alpha-beta-gamma-cyclodextrin tetrapolymers grafted by chitosan by direct melt polycondensation: 3 g of citric acid and 0.3 g of chitosan were transferred into a reactor which was maintained at a temperature of 140° C. A mixture of 1 g of alpha-cyclodextrin, 1.3 g of beta-cyclodextrin, 1.5 g of gamma-cyclodextrin, and 1 g of sodium phosphate dibasic ($Na_2HPO_4$) as catalyst was then added. The whole was stirred for 30 minutes under vacuum. The solid residue obtained according to the invention, was washed successively with three volumes of 20 mL of water. The fraction of water (60 mL) from washing was filtered by membrane then dried by spray-drying.

EXAMPLE 13

Synthesis of soluble calix[4]arene copolymers by direct melt polycondensation: 3 g of citric acid were transferred into a reactor which was maintained at a temperature of 140° C. A mixture of 3 g of calix[4]arenes and 0.5 g of sodium phosphate dibasic ($Na_2HPO_4$) as catalyst was then added. The whole was stirred for 30 minutes under vacuum. The solid residue obtained according to the invention, was washed successively with three volumes of 20 mL of water. The fraction of water (60 mL) from washing was filtered by membrane and then lyophilized.

EXAMPLE 14

Synthesis of insoluble calix[4]arene copolymers by direct melt polycondensation: 3 g of citric acid were transferred into a reactor which was maintained at a temperature of 140° C. A mixture of 3 g of calix[4]arenes and 0.5 g of sodium phosphate dibasic ($Na_2HPO_4$) as catalyst was then added. The whole was stirred for 60 minutes at a temperature of 170° C. under vacuum. The solid residue obtained according to the invention, was washed successively with three volumes of 20 mL of water and with two volumes of 50 mL of ethanol. The solid residue from washing was then dried at a temperature of 70° C. to obtain the insoluble composition.

EXAMPLE 15

Synthesis of insoluble calix[4]arene copolymers containing EDTA by direct melt polycondensation: 3 g of ethylene diamine tetra acetic (EDTA) were transferred into a reactor which was maintained at a temperature of 240° C. A mixture of 3 g of calix[4]arenes and 0.5 g of sodium phosphate dibasic ($Na_2HPO_4$) as catalyst was then added. The whole was stirred for 60 minutes at a temperature of 170° C. under vacuum. The solid residue obtained according to the invention, was washed successively with three volumes of 20 mL of water and with two volumes of 50 mL of ethanol. The solid residue from washing was then dried at a temperature of 70° C. to obtain the insoluble composition.

EXAMPLE 16

Synthesis of soluble calix[4]arene and calix[6]arene terpolymers by direct melt polycondensation: 3 g of citric acid were transferred into a reactor which was maintained at a temperature of 140° C. A mixture of 1.5 g of calix[4]arenes, 1.5 g of calix[6]arenes and 0.5 g of sodium phosphate dibasic ($Na_2HPO_4$) as catalyst was then added. The whole was stirred for 30 minutes under vacuum. The solid residue obtained according to the invention, was washed successively with three volumes of 20 mL of water. The fraction of water (60 mL) from washing was filtered by membrane and then lyophilized.

EXAMPLE 17

Molecular encapsulation of an insoluble anti-inflammatory drug "nimesulide" by cyclodextrin copolymers and tetrapolymers: Nimesulide (NIM) is a nonsteroidal anti-inflammatory (AINS) drug with high anti-inflammatory, antipyretic and analgesic activities. NIM is used to treat extra-articular and articular inflammatory forms. However, NIM is very sparingly soluble in water (0.03 mM) and this causes to many difficulties in pharmaceutical formulations for oral or parenteral delivery, which may lead to reduced bioavailability. Phase solubility study was carried out according to the method described by Higuchi to study the influence of the complexation of different cyclodextrins on the solubility of NIM. Native cyclodextrins, modified cyclodextrins, cyclodextrin copolymers and cyclodextrin tetrapolymers were used. The cyclodextrin tetrapolymer, based on 35% of alpha-cyclodextrin, 35% beta-cyclodextrin and 30% gamma-cyclodextrin, is synthesized by direct melt polycondensation according to the example 1 and the ratio cyclodextrin/citric acid is 1/3.

Phase Solubility Method: Higuchi's Method

Growing concentration of native or modified cyclodextrins, copolymers and tetrapolymers of cyclodextrin water solutions were prepared. The highest concentration of native cyclodextrins corresponded to their saturated concentration. An excess amount of NIM was mixed in these solutions. Suspensions were shaken at a temperature of 37° C. on a rotary flask shaker for 7 days and supernatants were filtered through polycarbonate membrane (0.45 µm pore size). The concentration of NIM in the filtrates was determined immediately after filtration by CLHP.

The table 5 represents the solubility of NIM with native and modified cyclodextrins, and with copolymers and tetrapolymers based on cyclodextrins. The solubilities were higher with synthesizing cyclodextrin copolymers and tetrapolymers according to the present invention.

TABLE 6

Apparent solubilization of nimesulide by copolymers, terpolymers and tetrapolymers based on cyclodextrins and by native or modified cyclodextrins.

| Cyclodextrins (CD) | [Nimésulid] max. (mg/ml) | Kc (mM$^{-1}$) |
|---|---|---|
| alpha (149 mM) | 0.077075 | 0.045 |
| beta (16.3 mM) | 0.09249 | 0.473 |
| gamma (179 mM) | 0.144901 | 0.0646 |
| PMbeta (250 mM) | 0.693675 | 0.289 |
| HPalpha (467 mM) | 0.323715 | 0.058 |
| HPbeta (300 mM) | 0.36996 | 0.11 |
| HPgamma350 mM) | 0.1954622 | 0.05 |
| CAPTISOL ® (92.5 mM) | 0.3083 | 0.314 |
| poly alpha-CD (20 mg/ml) | 0.68 | 2.045 |
| poly beta-CD (20 mg/ml) | 0.3 | 1.11 |
| poly gamma-CD (10 mg/ml) | 0.45 | 4.78 |
| poly (alpha, beta, gamma)-CD (20 mg/ml) | 0.8 | 2.42 |

EXAMPLE 18

Molecular encapsulation of insoluble antihelminthic <<albendazole>> by cyclodextrin copolymers and tetrapolymers Albendazole (ABZ) is a benzimidazole derivative with a broad spectrum of activity against human and animal helminthe parasites. ABZ therapy is very important in systemic cestode infections. Its international nomenclature is methyl [5-(propylthio)-1-H-benzimidazol-2yl]carbamate. Its formula associates a benzene cycle and an imidazol cycle. Albendazole is a poorly water-soluble drug ($5.10^{-4}$ mg/mL) and consequently, it is poorly absorbed from the gastro-intestinal tract. The complexation of various cyclodextrins on solubility of albendazole was studied. Native cyclodextrins, cyclodextrin copolymers and cyclodextrin tetrapolymers were used, according to Higuchi's method. Cyclodextrin tetrapolymers were composed of 70% alpha-CD, 10% beta-CD and 20% gamma-CD, and were synthesized by direct melt polycondensation, according to example 1. The ratio cyclodextrin/citric acid is 1/3.

Table 7 represents the apparent solubility of albendazole with native and modified cyclodextrins, and with copolymers and tetrapolymers based on cyclodextrin(s). The solubilities were higher with synthesizing cyclodextrin copolymers and tetrapolymers according to the present invention.

TABLE 7

Apparent solubilization of albendazole by copolymers, terpolymers and tetrapolymers based on cyclodextrins and by native cyclodextrins

| poly CDs | [ABZ] max. (mg/mL) |
|---|---|
| poly alpha-CD | 26 |
| poly beta-CD | 10 |
| poly gamma-CD | 20 |
| poly (alpha, beta, gamma)-CD | 28 |
| alpha-CD | 0.279 |
| beta-CD | 0.0435 |
| gamma-CD | 0.029 |

EXAMPLE 19

Stabilization of copper nanopowder suspension by copolymers, terpolymers and tetrapolymers based on cyclodextrins Solutions of synthesizing copolymers, terpolymers and tetrapolymers based on cyclodextrins according to the present invention, with a concentration of 1% (W/V), allow the stabilization of aqueous suspensions based on copper nanopowder (1% and 4%) (Picture 1). For only native cyclodextrins and cyclodextrin derivative(s) (HP-beta-CD and PM-beta-CD), a precipitation of copper nanopowder was visible 48 hours after the preparation of suspensions (picture 2).

The development of stable suspensions from copolymers, terpolymers and tetrapolymers based on cyclodextrins presents a major interest to improve the quality and the efficiency of the ferrofluids and catalysts.

EXAMPLE 20

Stabilization of emulsion based on silicon oil by cyclodextrin terpolymers: The used cyclodextrin terpolymers were synthesizing by direct melt polycondensation according to the example 10. After solubilization of 15 g of polymers into 45 g of water, an oil emulsion was made from 40 mL of silicon oil under strong agitation (vortex 800 rpm) for 2.5 min. (picture 3).

EXAMPLE 21

Adsorption of a dye by insoluble cyclodextrin tetrapolymers: In an aqueous solution containing 4 mg of a dye, either 100 mg of charged or non charged copolymers, or alpha-beta-gamma-cyclodextrin tetrapolymers were added and synthesized by direct melt polycondensation according to example 10. After stirring for 24 hours, the whole dye was absorbed by the insoluble cyclodextrin tetrapolymers (picture 4).

The invention claimed is:

1. A process for producing a composition, the composition comprising a polymer, copolymer, terpolymer and tetrapolymer, the process comprising the steps of:
    fusing a crosslinking agent in a reactor without water by a first heating at a melting temperature of the crosslinking agent, then by a second heating at a temperature: in a range
        of about 140 degrees Centigrade to about 150 degrees Centigrade to produce mainly a soluble composition, said soluble composition selected from the group consisting of polymer, copolymer, terpolymer, and tetrapolymer; or
        of about 170 degrees Centigrade to produce mainly an insoluble composition, said insoluble composition selected from the group consisting of polymer, copolymer, terpolymer and tetrapolymer; then
    adding a component to create a mixture, the component selected from the group consisting of calix[n]arene in a form of powder, cyclodextrin, a mixture of different calix[n]arenes; a mixture of different cyclodextrins, and a catalyst;
    stirring the mixture under vacuum to produce a composition, stirring to occur for a time selected from the group consisting of:
    between
        about 1 minute and 240 minutes when the desired end product is mainly the composition that is soluble; and
        about 2 hours when the desired end product is mainly the composition that is insoluble;
    washing the composition to produce a solid residue and a wash solution, said washing comprising successively rinsing the composition with three volumes of water, each of the volumes of water comprising 20 milliliters, and with two volumes of ethanol, each of the volumes of ethanol comprising 50 milliliters;
    drying the solid residue at a temperature of about 70 degrees Centigrade to obtain the composition that is insoluble;
    separating any remaining solid residue from the wash solution using a procedure selected from the group consisting of filtration and dialysis; and
    drying the wash solution by a process selected from the group consisting of spray-drying, atomization, lyophilization, and freeze-drying, said drying producing the composition that is soluble.

2. The process according to claim 1, wherein when the step of fusing a crosslinking agent is conducted at a temperature of about 170 degrees Centigrade, then this step further includes holding this temperature for a time period of at least 60 minutes.

3. The process according to claim 1, wherein when the step of fusing a crosslinking agent is conducted at a temperature in a range of about 140 degrees Centigrade to about 150 degrees Centigrade, then this step further includes holding this temperature for a time period of about 30 minutes.

4. The process according to claim 1, wherein the step of washing the composition is performed using water.

5. The process according to claim 1, wherein the mixture comprises a plurality of cyclodextrins in an amount greater than or equal to 1% by weight of the mixture after adding the plurality of cyclodextrins.

6. The process according to the claim 5, wherein the plurality of cyclodextrins is selected from the group consisting of:
    an alpha-cyclodextrin and beta-cyclodextrin mixture;
    an alpha-cyclodextrin and gamma-cyclodextrin mixture;
    a beta-cyclodextrin and gamma-cyclodextrin mixture;
    an alpha-cyclodextrin, beta-cyclodextrin and gamma-cyclodextrin mixture having a ratio of:
    alpha-cyclodextrin to beta-cyclodextrin of between 10/1 and 1/10;
    alpha-cyclodextrin to gamma-cyclodextrin of between 10/1 and 1/10; and
    beta-cyclodextrin to gamma-cyclodextrin of between 10/1 and 1/10.

7. The process according to claim 1, wherein n=4-20 for any calix[n]arene or calix[n]arene derivative present in the mixture.

8. The process according to one of the claim 1 wherein the mixture consists of:
    a plurality of components selected from the group consisting of a plurality of calix[n]arenes and a plurality of calix[n]arene derivatives;
    a range of n=4-20 for all of said plurality of components; and
    said plurality of components consists of at least two different values of n within said range of n=4-20.

9. The process according to claim 1, wherein the mixture consists of a plurality of components selected from the group consisting of a calix[n]arene and a cyclodextrin.

10. The process according to claim 1, wherein the weight of the crosslinking agent comprises a percentage of the total weight of the mixture that is at least 20%.

11. The process according to claim 1, wherein the component is selected from the group consisting of calix[n]arenes and cyclodextrins;
    and wherein the ratio of the weight of the component to the weight of the crosslinking agent is at least 0.5.

12. The process according to claim 1, wherein the catalyst is selected from the group consisting of dihydrogen phosphate, hydrogen phosphate, phosphate, hypophosphite, alkali metal phosphate, alkali metal salt of polyphosphoric acid, carbonate, bicarbonate, acetate, borate, alkali metal hydroxide, aliphatic amine and ammonia, sodium hydrogen phosphate, sodium dihydrogen phosphate and sodium hypophosphite.

13. The process according to claim 1, wherein the catalyst is associated with a support, said support selected from the group consisting of an inorganic solid support, and a mixture of mineral solid support, said mixture of mineral solid support selected from the group consisting of alumina, silica gel, silica, aluminum silicate, zeolite, titanium oxide, zirconium, niobium oxide, chromium oxide, magnesium and tin oxide, wherein said mixture of mineral solid support increases heat-transfer surface area during polymerization.

14. The process according to claim 1, wherein:
the cyclodextrin is selected from the group consisting of α-cyclodextrin, β-cyclodextrin, and γ-cyclodextrin; and
the mixture of different cyclodextrins comprises cyclodextrin derivatives selected from the group consisting of hydroxypropyl, methyl, ethyl, sulfobutylether, acetyl derivative of α-cyclodextrin, β-cyclodextrin, γ-cyclodextrin and a binary or ternary mixture formed from cyclodextrin and the derivatives thereof.

15. The process according to claim 1, wherein the crosslinking agent is selected from the group consisting of a poly(carboxylic) acid and poly(carboxylic) acid anhydride, saturated acyclic poly(carboxylic) acid, unsaturated acyclic poly(carboxylic) acid, saturated cyclic poly(carboxylic) acid, unsaturated cyclic poly(carboxylic) acid, aromatic poly(carboxylic) acid, hydroxypoly(carboxylic) acid, citric acid, poly (acrylic) acid, poly(methacrylic) acid, 1,2,3,4-butanetetracarboxylic acid, 1,2,3-propanetricarboxylic acid, aconitic acid, all-cis-t,2,3,4cyclopentanetetracarboxylic acid, mellitic acid, oxydisuccinic acid, and thiodisuccinic acid.

16. The process according to claim 1, further comprising the step of changing the composition by an action selected from the group consisting of:
positively charging the composition;
negatively charging the composition;
adding fatty acid chains to the composition;
adding PEG to the composition;
adding PVP to the composition;
adding chitosan to the composition; and
adding amino-acid to the composition.

17. A process according to claim 1, wherein the composition is in a form selected from the group consisting of a powder, a tablet, a capsule, a pellet, a cream, and an emulsion, said emulsion selected from the group consisting of an aqueous emulsion, an oily emulsion, a multiple emulsion, solution, colloidal solution, and a suspension.

* * * * *